United States Patent [19]

Klomp

[11] 4,019,883

[45] Apr. 26, 1977

[54] VORTEX SULFURIC ACID SEPARATOR

[75] Inventor: Edward D. Klomp, Mount Clemens, Mich.

[73] Assignee: General Motors Corporation, Detroit, Mich.

[22] Filed: June 2, 1975

[21] Appl. No.: 582,776

[52] U.S. Cl. .................................. 55/264; 55/267; 55/460; 55/DIG. 30; 60/308; 60/319; 209/144

[51] Int. Cl.² ........................................ B01D 51/00

[58] Field of Search ............ 55/226, 261, 267, 413, 55/414, 416, 459 R, 459 A, 459 B, 459 C, 459 D, 460, 468, DIG. 30, 264, 202, 203, 204, 205, 447, 465, 451, 337, 392; 60/311, 319, 320, 308, 309; 209/144, 211

[56] References Cited

UNITED STATES PATENTS

| | | | |
|---|---|---|---|
| 1,600,762 | 9/1926 | Hawley | 55/460 X |
| 2,386,282 | 10/1945 | Watson et al. | 55/468 X |
| 2,519,028 | 8/1950 | Dodge | 55/460 X |
| 2,587,416 | 2/1952 | Vedder | 55/416 X |
| 2,675,358 | 4/1954 | Fenley, Jr. | 55/DIG. 30 |
| 2,676,667 | 4/1954 | Dodge | 55/460 X |
| 2,708,834 | 5/1955 | Dodge | 55/460 X |
| 2,937,141 | 5/1960 | Helwig | 55/459 R |
| 3,257,798 | 6/1966 | Hass | 55/DIG. 30 |
| 3,577,728 | 5/1971 | Von Brimer | 60/308 |
| 3,598,540 | 8/1971 | Chase | 55/468 |

Primary Examiner—Frank W. Lutter
Assistant Examiner—David L. Lacey
Attorney, Agent, or Firm—Sidney Carter

[57] ABSTRACT

A separator for removing sulfuric acid from a hot gas stream comprising a substantially cylindrical body having tangentially arranged inlet and outlet conduits to create a vortical flow path of the gas being treated, means being provided for adding cooling air to the gas, the inner surface of the body being provided with baffle means to cause a high degree of turbulence in the gases at the surface which is maintained at a temperature below that for condensation of sulfuric acid.

3 Claims, 3 Drawing Figures

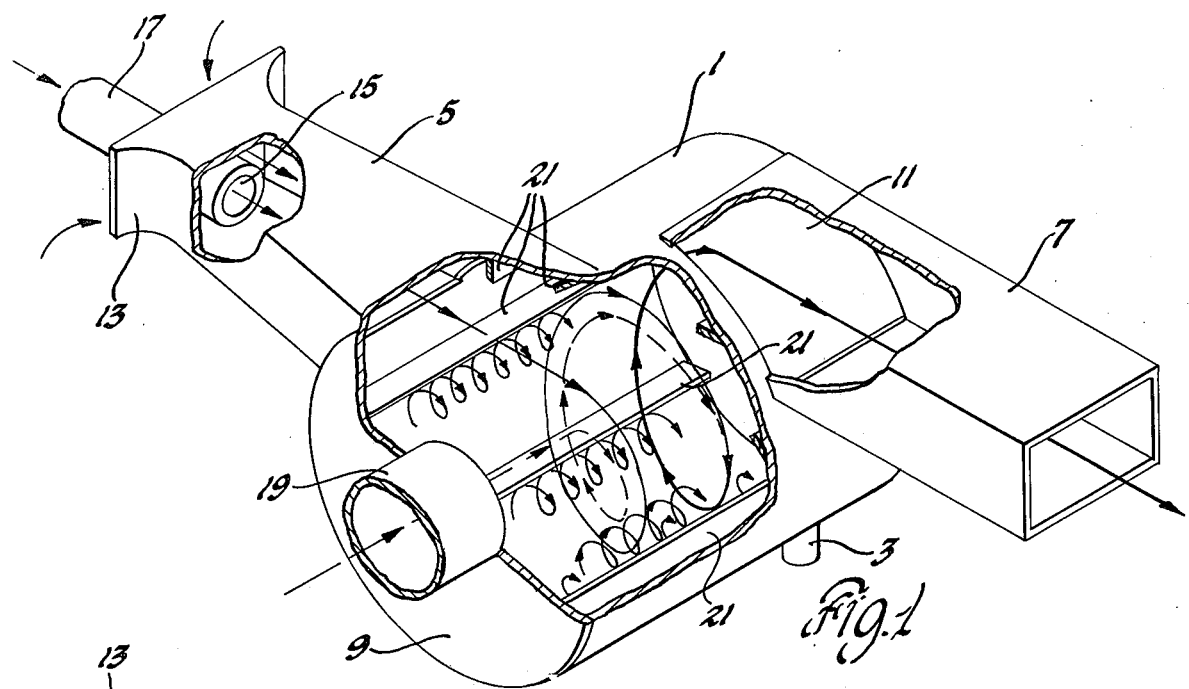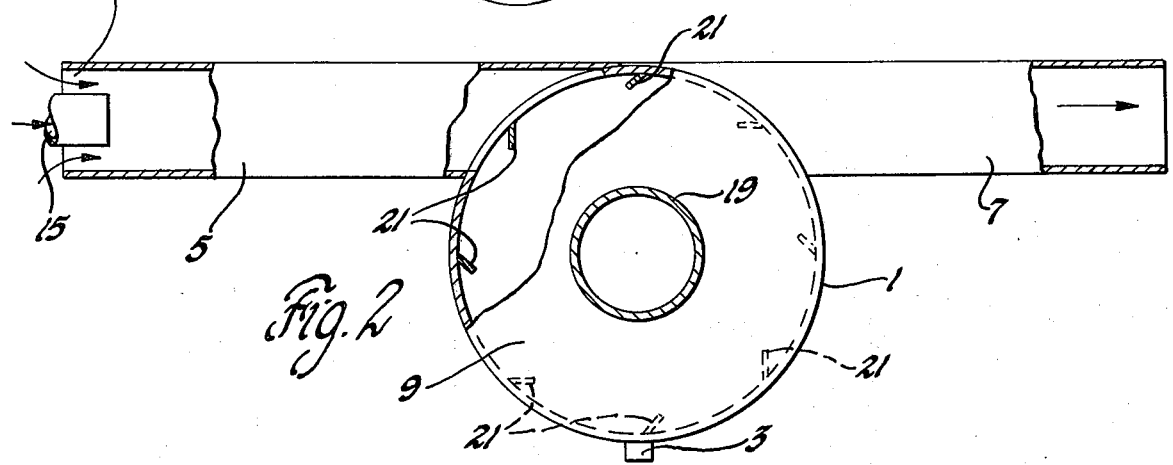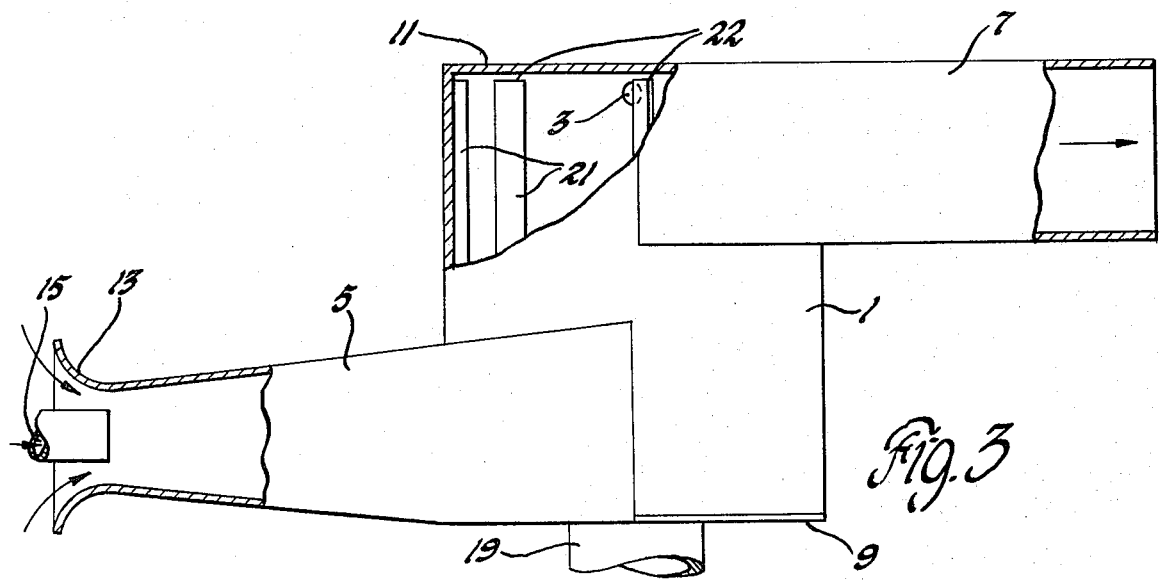

VORTEX SULFURIC ACID SEPARATOR

In view of the requirement for protection of the environment, a need has arisen for effective and relatively inexpensive devices and methods for separating particulates and potentially harmful substances from waste gas streams vented to atmosphere. Such streams originate in various manufacturing processes, incineration and power plants, and as the exhaust from automotive vehicles.

The control of unburned hydrocarbons and carbon monoxide in vehicle exhaust streams has been achieved by the use of catalytic converters which serve to oxidize these constituents before being vented to atmosphere. However, where the engine fuel contains sulfur, $SO_2$ in varying amounts depending on the fuel sulfur content is produced by the combustion process of the engine. Some of this $SO_2$ is then converted to $SO_3$ in the converter, this being subject to hydrolysis with water to form sulfuric acid. Both vapor and droplets of acid are formed prior to entering the atmosphere, the liquid acid mist being in the form normally of sub-micron liquid droplets.

The use of cyclone-type devices to separate liquids and solids entrained in a gaseous stream is well known in the art. However, such devices require droplet diameters greater than about 30 microns.

It is therefore an object of my invention to provide a device for separating sulfuric acid vapors and submicron sized droplets of acid from a hot exhaust gas stream. It is another object of my invention to provide a compact, relatively inexpensive device for the condensation and separation of sulfuric acid vapors and droplets from a hot gas stream. It is a further object of my invention to provide a vortex type separator having means for mixing cooling air with the hot stream of gases to be treated and to cause turbulent flow at the inner wall surface of the separator for maximum mixing of gaseous constituents and good mass transfer to the surface to establish effective flow of acid molecules to the wall.

These and other objects of my invention are achieved by providing a substantially cylindrical body having tangentially arranged inlet and outlet conduits to create a vortical flow path of the gas being treated, means being provided for adding cooling air to the gas, the inner surface of the body being provided with baffle means to cause a high degree of turbulence in the gases at the wall surface which is maintained at a temperature below that for condensation of sulfuric acid, all as set forth in the description which follows taken in conjunction with the drawings in which FIG. 1 shows a perspective view of a preferred embodiment of my invention;

FIG. 2 shows an end view of the device shown in FIG. 1 with portions broken away to show the features of construction; and FIG. 3 shows a side view of the device embodying my invention.

As best shown in FIG. 1, the device of my invention comprises a substantially cylindrical body member 1 having a drain pipe or other drain means 3 located at the bottom-most portion thereof for the purpose of removing sulfuric acid and other materials such as particulates which are separated therein. An inlet 5 and an outlet 7 are provided at opposite ends 9 and 11, respectively, of the body in order to accommodate the entrance and exit of the gaseous stream to be treated.

As shown, the nozzle members 5 and 7 are arranged so as to provide tangential inlet and exit gas paths with respect to the inner wall surface of the body member 1. By such an arrangement, a vortical flow path of the gases through the body member is assured. However, a vortical flow path in and of itself will not result in the separation of sulfuric acid fumes and droplets of submicron size such as is encountered in many industrial exhaust gas stream and more particularly, in the exhaust stream from internal combustion engines.

Accordingly, I have found it necessary to provide for the quenching of the inlet gas stream for treatment in order to substantially reduce its temperature, and for the creation of a turbulent flow stream adjacent the inner wall surface to accomplish effective separation of sulfuric acid from the high temperature, high velocity flow stream.

In the preferred embodiment of my invention shown in the drawings, the inlet 5 is formed with venturi section 13, the outlet end 15 of the engine exhaust pipe 17 being located substantially at the throat of the venturi. By this arrangement, I am able to use the energy of the exhaust gases subject to treatment to activate a jet pumping action for supplying primary cooling air to the hot gases being treated in the body 1, the cooling ambient air entering, as shown in the drawings, through an open end of the inlet 5. It will be readily apparent that other means such as one or more air pipes entering at or just downstream of the throat may be utilized. Similarly, it is readily apparent that a separate air pump mechanism may be used in lieu of the venturi section for adding cooling air to the gas stream subject to treatment. Also, as shown in the drawings, I have provided an auxiliary air inlet 19 substantially at the longitudinal axis of the body member in order to utilize the pressure differential between the center portion of the vortical flow stream and atmosphere to pump a secondary stream of cooling air into the body at the center position. This not only provides sufficient quenching fluid but also enables full utilization of the physics involved in the system of my invention to help reduce costs by eliminating the need for extra pumping hardware.

As indicated above and as shown in the drawings, I have provided means on the inner wall surface of the body member 1 to disturb the vortical flow path at the surface and thus create a substantial turbulent flow condition in the gases flowing through the body. As shown in the drawings, this turbulence is formed by providing a plurality of baffle members 21 on the inner wall surface extending generally from the end 9 to the end 11 of the body, the end of each baffle being spaced from the low end of the body as at 22 to permit the collection and drainage of separated acid and other materials. While the drain means 3 is shown at the outlet end of the body 1, this may be located at either end. Similarly, while I have shown the use of baffles, any means which will enhance turbulance production will be satisfactory, e.g., inwardly extending dimples or other protrusions formed in the surface, or a plurality of short, spaced apart baffles or vortex generators instead of single long baffles.

By way of example and to illustrate the operation of the device of my invention, a body member having an axial length to diameter ratio of at least about 1.2:1 has been considered effective for the purposes of my invention. More particularly, a design considered suitable for use with a 455 cu. in. displacement V-8 engine operating near wide-open throttle at 4,000 rpm and producing an exhaust flow of 280 cu. ft. per minute and a pressure at the end of the exhaust pipe of about 4 lb./sq. in., gage, comprises a body member of 10 in. diameter, 12 in. in length and having a 3 in. secondary air inlet concentrically formed at the inlet end. A venturi section has a 3 in. diameter throat in which the standard size tailpipe is located. The inlet and outlet nozzles are 3 by 4¾ in. in side dimensions. Such configuration and operating conditions produce an air to exhaust flow ratio of about 4:1, ¾ of the air being drawn in through the venturi section. With an exhaust temperature of about 900° F., and an ambient air temperature of about 70° F., the outside surface of the member 1 being also subjected to the influence of cooling air, the temperature of the turbulent layer at the inner surface of the body 1 is reduced to a temperature of about 250° F. at which point it has been found that more than 90% of the sulfuric acid in the exhaust stream is separated out. In the operation of the device of my invention, it is theorized that maintaining the temperature at the inner wall surface below the condensation temperature of the sulfuric acid, keeps the concentration of the acid in the gases at the wall at a minimum so that molecular transport across any given radial section of the body 1 tends to drive the sulfuric acid from the center portion to the outer wall portion in order to equalize concentration. This tendency is further aided by the turbulent mixing of the gases at the wall surface to reduce the thickness of the laminar sub-layer.

From the foregoing description it will be apparent that I have provided a device which is both relatively simple in construction and inexpensive so as to enable economic separation of sulfuric acid from exhaust gas emission streams. The treatment and disposal of the sulfuric acid drained from the separator forms no part of my invention and is subject to known treatment and disposal within the skill of the art. While I have described my invention in terms of a preferred embodiment, alternative and equivalent constructions, e.g., special cooling fins on the outer surface of the body, will be apparent to those skilled in the art and are contemplated as being within my invention as set forth in the claims which follow.

What is claimed is:

1. A device in combination with an exhaust tube for removing sulfuric acid from a hot exhaust gas stream which flows through said exhaust tube comprising a substantially cylindrical body member having a gas inlet means at one end and a gas outlet at the other end, both said inlet means and said outlet being arranged tangent to the cylinder inner wall surface to form a vortical flow path through said cylinder between said ends, said inlet means having an open inlet end which is positioned with respect to said exhaust tube such as to receive the exhaust gas stream for treatment, and for supplying cooling air to said gas inlet end, a plurality of means provided on said inner wall surface and projecting therefrom into the vortical flow path to create turbulent flow in said gas stream to enable a maximum surface contact and intermixture of the air and exhaust gas and maximum mass transfer to said surface, and a drain provided in said body member through which condensed sulfuric acid may be removed, said inner wall surface being at a temperature below the condensation temperature of the sulfuric acid in the exhaust gas stream, molecular transport and the turbulent mixing of the gases tending to maintain the acid concentration constant across any radial section through the body member to thus cause a flow of acid molecules and very small droplets toward the cool inner wall surface at which the acid concentration in the gases is the least.

2. The device of claim 1 wherein an axial air inlet opening is provided in the central part of the end of said body member adjacent said inlet means to enable the addition of a secondary stream of cooling air at the core portion of the vortical flow path of the gas mixture.

3. The device of claim 1 wherein said means on the inner wall surface comprises a plurality of baffle plates extending from said inlet means end to said outlet end of said body member.

* * * * *